US010148790B2

(12) United States Patent
Mapes et al.

(10) Patent No.: US 10,148,790 B2
(45) Date of Patent: Dec. 4, 2018

(54) DEPLOYMENT OF INTEGRATIVE HTML-BASED ENGINE FROM AN EDGE SERVER

(71) Applicant: Bank of America Corporation, Charlotte, NC (US)

(72) Inventors: Duncan Mapes, Charlotte, NC (US); Jason R. Baklavas, Charlotte, NC (US); Daniel E. Bartlett, Charlotte, NC (US); Jason T. Powell, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 179 days.

(21) Appl. No.: 15/060,794

(22) Filed: Mar. 4, 2016

(65) Prior Publication Data

US 2017/0257464 A1 Sep. 7, 2017

(51) Int. Cl.
*G06F 15/16* (2006.01)
*H04L 29/06* (2006.01)
*H04L 29/08* (2006.01)
*G06F 17/30* (2006.01)

(52) U.S. Cl.
CPC ........ *H04L 67/42* (2013.01); *G06F 17/30896* (2013.01); *H04L 67/02* (2013.01)

(58) Field of Classification Search
CPC .... H04L 67/42; H04L 67/02; G06F 17/30896
USPC .................................................. 709/202, 203
See application file for complete search history.

(56) References Cited

U.S. PATENT DOCUMENTS 8,959,427 B1 2/2015 Carlsson et al.
2004/0117213 A1 6/2004 Pache, Jr. et al.
(Continued)

FOREIGN PATENT DOCUMENTS

CA 2626168 8/2008
CN 102096715 6/2011
(Continued)

OTHER PUBLICATIONS

"What is an Edge, Server/ Router/ Device?" Sep. 21, 2009, Stack Overflow.
(Continued)

*Primary Examiner* — Wing F Chan
*Assistant Examiner* — Joseph R Maniwang
(74) *Attorney, Agent, or Firm* — Weiss & Arons LLP; Michael A. Springs, Esq.

(57) ABSTRACT

Apparatus and methods for providing content to a client browser. The methods may include providing a web page compiling machine. The methods may include providing an edge server that interfaces between the compiling machine and the client browser. The edge server may include a web server. The methods may include receiving at the edge server, from the compiling machine, a first compiled static web page that includes an instruction, executable by the client browser, for determining a client configuration parameter. The methods may include delivering, from the edge server, the first compiled static web page component to the client browser. The methods may include receiving, at the edge server, from the client browser a request for a compiled static web page component that corresponds to the parameter.

15 Claims, 4 Drawing Sheets

(56) References Cited

U.S. PATENT DOCUMENTS

| | | | | |
|---|---|---|---|---|
| 2007/0260670 | A1* | 11/2007 | Chang | G06F 9/541 709/203 |
| 2008/0201118 | A1 | 8/2008 | Luo | |
| 2010/0180192 | A1* | 7/2010 | Hall | G06F 17/30905 715/234 |
| 2014/0280515 | A1* | 9/2014 | Wei | H04L 67/02 709/203 |
| 2015/0180733 | A1* | 6/2015 | Krutzler | H04L 41/509 709/219 |

FOREIGN PATENT DOCUMENTS

| | | |
|---|---|---|
| CN | 101183395 | 12/2011 |
| CN | 101976261 | 4/2012 |
| EP | 1872314 | 11/2014 |
| WO | WO0177883 | 10/2001 |
| WO | WO2007062026 | 5/2007 |

OTHER PUBLICATIONS

"ASP.NET Web Site Precompilation Overview," Retrieved on Jan. 19, 2016, Microsoft, Redmond, Washington.
"Dynamic Web Page," Nov. 7, 2015, Wikimedia Foundation, Inc.
"Ajax (programming)," Nov. 9, 2015, Wikimedia Foundation, Inc.
Jesse James Garrett, "Ajax: A New Approach to Web Applications," Feb. 18, 2005, Adaptive Path Inc., San Francisco, CA.
Chris Ullman, "What is Ajax?" Retrieved on Nov. 11, 2015, John Wiley & Sons, Inc., Hoboken, New Jersey.
"Bootstrap," Retrieved on Jun. 29, 2016, http://getbootstrap.com/.
"Foundation: The Most Advanced Responsive Front-End Framework in the World," Retrieved on Jun. 28, 2016, http://foundation.zurb.com/.
"AngularsJS: HTML Enhanced for Web Apps!" Retrieved on Jun. 29, 2016, https://angularjs.org/.
"Backbone.JS," Retrieved on Jun. 29, 2016, http://backbonejs.org/.
"React: A JavaScript library for Building User Interfaces," Retrieved on Jun. 29, 2016, https://facebook.github.io/react/.
"Ember.js—A Framework for Creating Ambitious Web Applications," Retrieved on Jun. 29, 2016, http://emberjs.com/.
"Sass: Syntactically Awesome Style Sheets," Retrieved on Jun. 29, 2016, http://sass-lang.com/.
"Grunt: The JavaScript Task Runner," Retrieved on Jun. 29, 2016, http://gruntjs.com/.
"Node.js," Retrieved on Jun. 29, 2016, https://nodejs.org/en/.
"Handlebars.js: Minimal Templating on Steroids," Retrieved on Jun. 29, 2016, http://handlebarsjs.com/.
"What is jQuery," Retrieved on Jun. 29, 2016, http://jquery.com/.

* cited by examiner

DEPLOYMENT OF INTEGRATIVE HTML-BASED ENGINE FROM AN EDGE SERVER

FIELD OF TECHNOLOGY

Aspects of the invention relate to assembly of HTML web pages at build time in a client web browser.

BACKGROUND

An HTML file was historically stored on a server and transmitted, of a piece, to a client browser upon request. As web page usage increased, developers partitioned content out of HTML files so that content could be updated without requiring the update of the HTML files themselves. Upon request by a client, at "run time," the server built the content into the HTML files at the "back end" and delivered the HTML files to the client at the "front end." Utilities were then created for making reusable parts of web pages modifiable by centrally changing attribute values of those parts, again at run time and again at the back-end. Dynamic back end tools have become available for building the HTML files on the back-end. The files, when built are sometimes saved for reuse on the back-end.

HTML assembly on the front end may reduce latency time.

It would therefore be desirable to provide apparatus and methods for providing content to a client browser.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
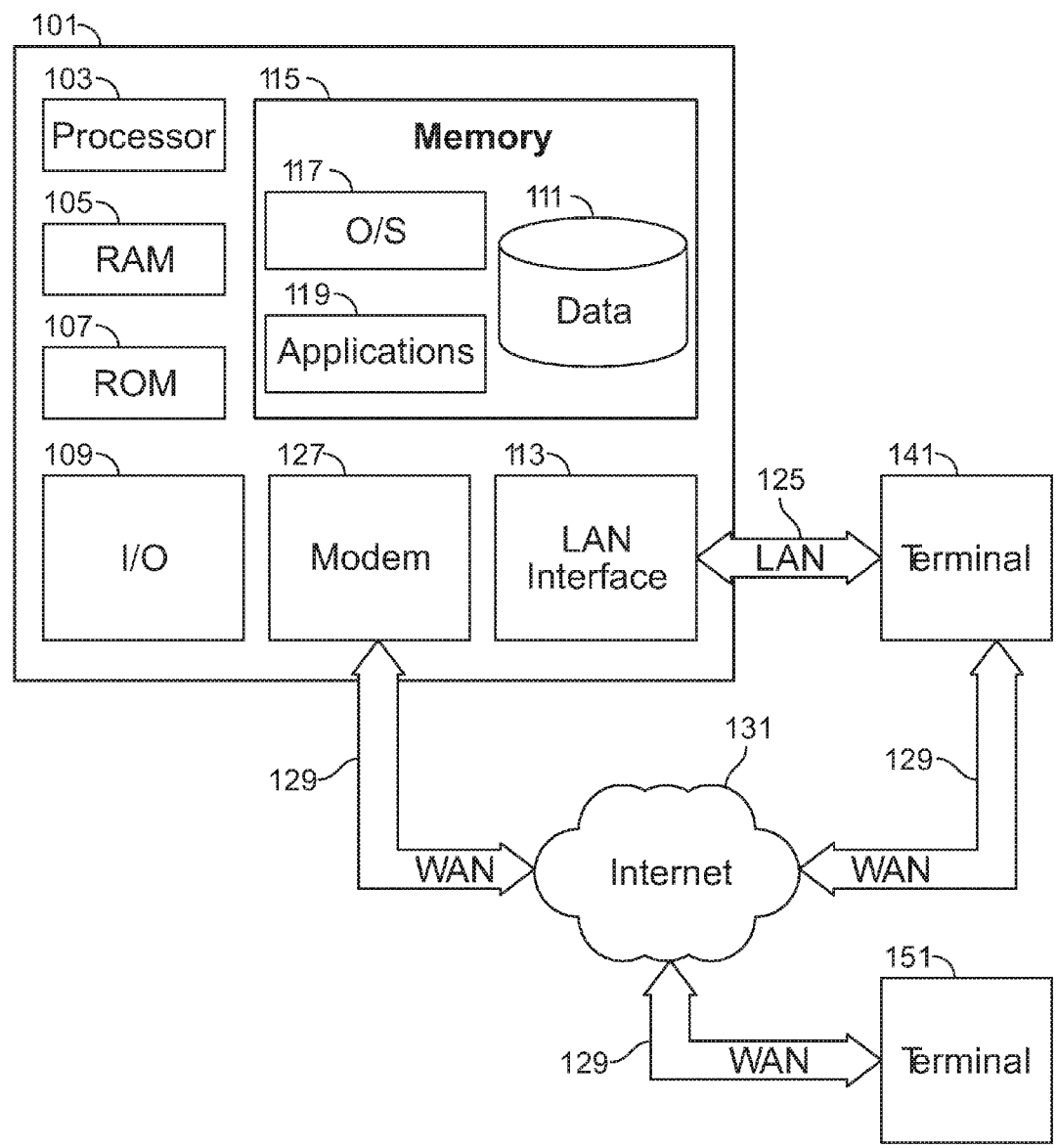
FIG. 1 shows illustrative apparatus in accordance with principles of the invention.

Apparatus and methods for providing content to a client browser are provided. The apparatus may implement the methods. The methods may include providing a web page compiling machine. The methods may include providing an edge server that interfaces between the compiling machine and the client browser. The edge server may include a web server. The methods may include receiving at the edge server, from the compiling machine, a first compiled static web page that includes an instruction, executable by the client browser, for determining a client configuration parameter. The methods may include delivering, from the edge server, the first compiled static web page component to the client browser. The methods may include receiving, at the edge server, from the client browser a request for a compiled static web page component that corresponds to the parameter.

The edge server may be a server that serves compiled web pages. The edge server may be a server that serves compiled web page components. A component may include content. A component may include logic. A component may include configuration information. The configuration information may define an area of a browser display region. The area may include some or all of the browser display region. The component may be configured to be contiguous with other components in the display region.

The edge server may reside on an "edge" of a server network such that it directly "faces" the client. The edge server may receive compiled components from a rendering server that is "behind" the edge server. The client thus interacts directly with the edge server and not the rendering server. This may reduce time-to-first-byte, because a direct call to the rendering server may require building a web page or a component before delivery of the page or the component to the browser.

The compiling machine may provide developers with any suitable tools. The tools may provide for coding utilities that perform file or database input and result or that perform calculations. The tools may include a java compiler such as node.js, a task runner such as Grunt, a cascading sheet style programming language such as Sass, a browser-independent ruby-on-rails template engine such as Handlebars or any other suitable tools. A developer may use the tools to provide to the edge server compiled web pages and compiled web page components for service to the client browser. A developer may use the tools to provide to the edge server one or more instructions for performing information-gathering and web-page execution tasks within the browser. The instructions may be embedded in an hypertext markup language ("HTML") file that is transmitted to the edge server for service to, and execution within, the client browser.

The instructions may be executable in a client browser that supports streamlined framework-level modifications (such as Zurb Foundation, e.g.), document object model manipulation libraries (such as jQuery, e.g.), web application framework libraries (such as Angularjs, e.g.), single-page application frameworks (such as Ember, e.g.), various javascript libraries (such as ReactJS, e.g.), model view controllers (such as Backbone.JS, e.g.), HTML, CSS and Javascript frameworks (such as Boostrap, e.g.) and any other suitable features.

The client configuration parameter may be a client browser parameter. Table 1 lists illustrative client browser parameters.

TABLE 1

Illustrative client browser parameters.

Illustrative client browser parameters

Application Name
Version No.
Geolocation (T|F)
ViewPort Size
Operating System
Cookies
IP Address
Url Parameters
Referrer (the page the user came from)
User Agent
Browser Feature Detection The client configuration parameter may be a client hardware parameter.

Table 2 lists illustrative client hardware parameters.

TABLE 2

Illustrative client hardware parameters.

Illustrative client hardware parameters

Device type
Model
Operating system
Version
Viewport Size
Mobile (T|F)

The methods may include receiving, at the edge server, a plurality of compiled static web page components. The plurality may include the compiled static web page component. The parameter may be one of a plurality of parameters. Each of the compiled static web page components may correspond to one or more of the parameters.

A static web page may include an HTML text file on a web server with no runtime logic executed on the server. A static web page may include script, such as Javascript, for executing instructions, queries and logic in the client browser.

The methods may include, at the compiling machine, compiling the plurality of compiled static web page components.

The plurality of compiled web page components may be components of one web page. The components may be components of one web page that is not on display by the browser.

The plurality of compiled web page components may be components of a plurality of web pages. The components may be components of a plurality of web pages that are not on display by the browser.

The plurality of compiled web page components may be part of a first web page. The first web page may be a web page that is not on display by the browser. The plurality of compiled web page components may be part of a second web page. The second web page may be a web page that is not on display by the browser. A component may be part of more than one web page. A component may be displayed in more than one web page.

The methods may include, at the compiling machine, transmitting to the edge server a plurality of browser-executable scripts, each of the executable scripts corresponding to one of the components.

The methods may include receiving at the edge server a request for a script from the plurality of scripts.

The request may correspond to the client parameter.

The instruction may query a client device hardware parameter. The instruction may query a client browser software parameter. The instruction may query the presence of a web page component in the browser. The instruction may be a first instruction. The script may include a second instruction. The second instruction may be configured to query a client parameter.

The second instruction may be configured to query a client browser parameter.

The second instruction may be configured to query a client hardware parameter.

The script may be configured to receive input from a client data input device via a rendering of the static web page component by the client browser. The script may be configured to trigger a request to a virtual machine for information. The virtual machine may reside on the edge server.

The parameter may be a client hardware parameter. The instruction may include a client hardware parameter query, corresponding to the client hardware parameter, and a client hardware parameter result. The instruction may include a client browser parameter query and a client browser parameter result. The instruction may include a client input query, for input from a client data input device via a rendering of the static web page component by the client browser, and a client-input result. The result may correspond to dynamic data residing on the edge server.

The static web page component may be a first static web page component. The result may correspond to a second static web page component. The instruction may retrieve from the edge server the second static web page component for display by the browser.

The client-input result may be provided to a virtual application server configured within the edge server. Table 3 lists illustrative types of client-input result along with illustrative applications that may be used to provide responsive data to the client browser.

TABLE 3

Illustrative types of client-input result along with illustrative applications that may be used to provide responsive data to the client browser.

| Illustrative client-input result | Illustrative Application |
| --- | --- |
| Amortization period | Payment calculator |
| Interest rate | " |
| Customer name | Authentication engine |
| Customer PIN | " |
| Adjusted Gross Income | Financial product advisor |
| Request Payment Amount | Interest Rate Pricing Engine |

A program may process the results to condition the request upon the results. The program may include one or more if/then statements. The statements may be nested to achieve multi-variable conditioning.

For example, a program may include a conditional statement such as:

```
IF COOKIE(STATE) == NC
    THEN PROVIDE NC INTEREST RATES
    IF MOBILE == TRUE
        THEN PROVIDE 2 TYPES OF LOAN
    ELSE
        PROVIDE ALL AVAILABLE TYPES
ELSE DISPLAY DEFAULTS
IF PRODUCT SELECTED == ARM
    THEN QUERY ARM PRICING ENGINE
ELSE
    THEN QUERY FIXED PRICING ENGINE.
```

The request may include an identifier. The identifier may be keyed to the client hardware parameter result. The identifier may be keyed to the client software parameter result.

The identifier may be keyed to the client-input result.

The instruction may be configured to formulate a platform identifier corresponding to the client-input result. The platform identifier may correspond to an element of a virtual machine residing on the edge server. The element may correspond to an edge server resource for processing the client-input result.

The platform identifier may correspond to a software platform that is suited to presentation of information corresponding to one or more of the results. The platform may correspond to a business function within an organization. The platform may include its own content, site configuration, page configurations, style sheets, formats or other suitable resources.

The component may be configured to be displayed by the client browser concurrently with a plurality of other components.

The compiling machine may be an enterprise grade static site generator with a responsive component architecture. It may allow an enterprise to build and deploy web pages at a high velocity while automating many of the time consuming aspects of web development. The generator may promotes a service oriented architecture and abstraction of the presentation and data layers of a web application.

The content and data layers may provide rapid delivery and configuration to desktop and mobile devices.

Whereas in the past HTML was generated at runtime, the compiling server generates HTML at build time.

The compiling server may have a service-oriented architecture in that functionality and configuration are implemented at the "back-end", so an API may be used to provide functionality independent of user device. The device may be a desktop machine, a mobile web-enabled device, and MDA or any other suitable device.

Rendering at build time instead of runtime may reduce the time to first byte by ~76%. Wait time goes down from 290 ms to 68 ms in a typical example.) This provides an opportunity to accelerate page delivery (not just processing time) via a content delivery network.

Static HTML web servers, such as the edge server can be very lean and secure because they are only serving files, not taking inputs. Static HTML files may never need a restart/bounce/etc. This may simplify updates in lower level environments (LLEs), which may simplify and expedite development and time to market. LLEs allow for a publishing release model for front-end change.

The compiling machine may be used to perform local builds governed by site and page configuration files. An entire web site may be built based on the local builds. and build the entire site.

Content and configurations may be sourced from JSON data objects. The JSON objects may be combined with components (e.g., modules, layouts, etc) to render static files (e.g., HTML, CSS, JS and other assets). The components may be reusable.

Builds may be optimized by building only components that have changed. Partial page support may be included.

Each module may include one or more web pages. The web pages may be linked or otherwise interrelated. Each module may be defined at the viewport level A shell or placeholder module may allow content injection that does not have a 1:1 swap. Typically, rules will be applied to modify default values (a 1:1 swap). A placeholder may exist for scenarios in which there is no default. One example may be if a complex engagement area is designated only for certain conditions, not by default, and is not replacing any existing functionality on the page, then it may be an augmentation that is added via the rules into its placeholder module.

Framework for auto generation of relevant responsive web design ("RWD") rules and code based on configuration. Examples of configurations and outputs are included below:
Example 1 config: ["small", "medium"]
Example 1 output: rules that state "small and medium"
Example 2 config: ["small"]
Example 2 output: rules that state "small only"
Example 3 config: ["small, "medium", "large"]
Example 3 output: rules that state "all"

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a computing device 101 (alternatively referred to herein as a "server or computer") that may be used according to an illustrative embodiment of the invention. The computer server 101 may have a processor 103 for controlling overall operation of the server and its associated components, including RAM 105, ROM 107, input/output ("I/O") module 109, and memory 115.

I/O module 109 may include a microphone, keypad, touch screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to execute database queries, compile HTML files and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
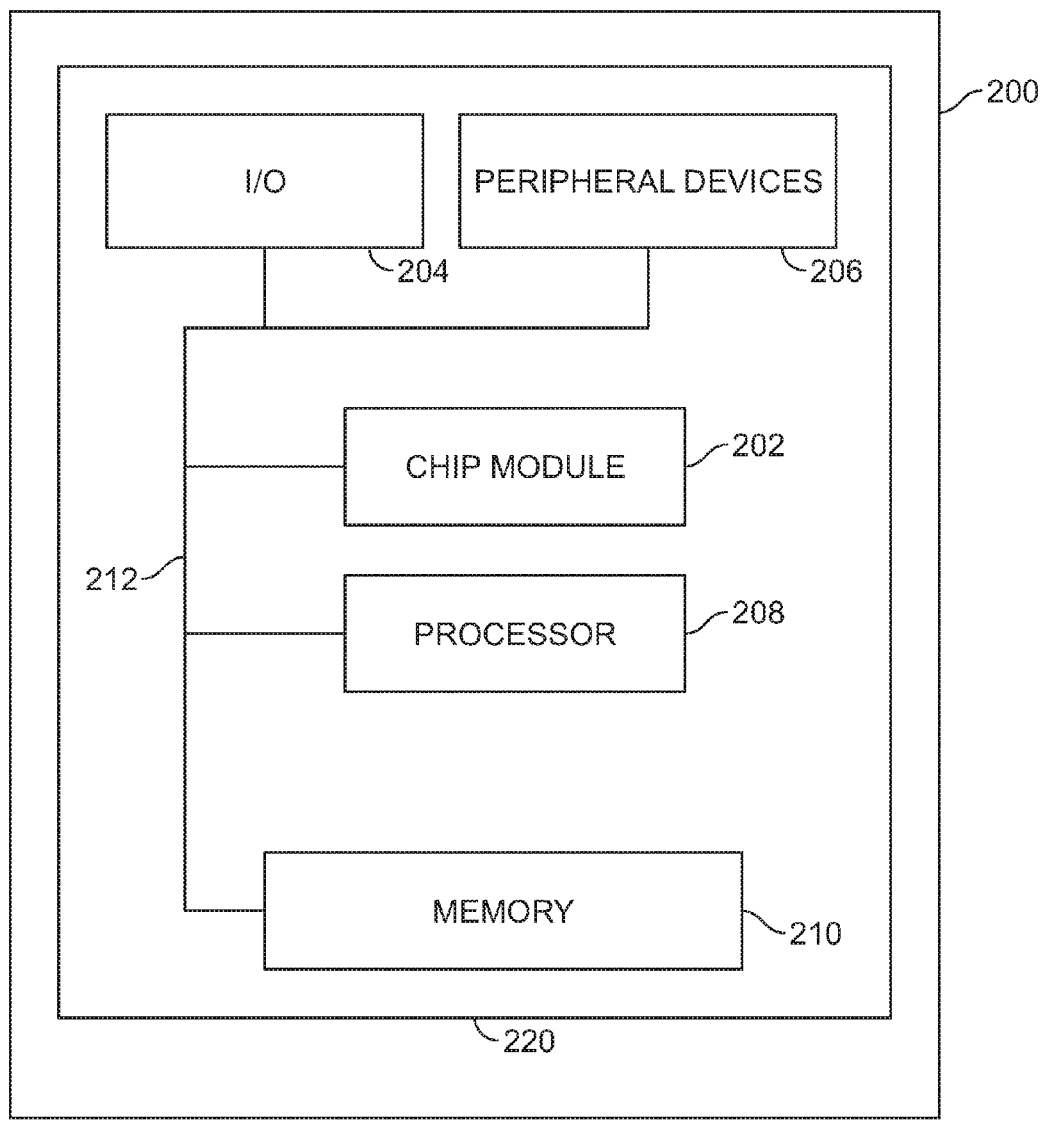
FIG. 2 shows illustrative apparatus in accordance with principles of the invention.

FIG. 2 shows an illustrative apparatus 200 that may be configured in accordance with the principles of the invention. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may process instructions in a browser, formulate data requests and control data display; and machine-readable memory 210.

Machine-readable memory 210 may be configured to store in machine-readable data structures: HTML files, partial HTML files, javascript files, database records and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
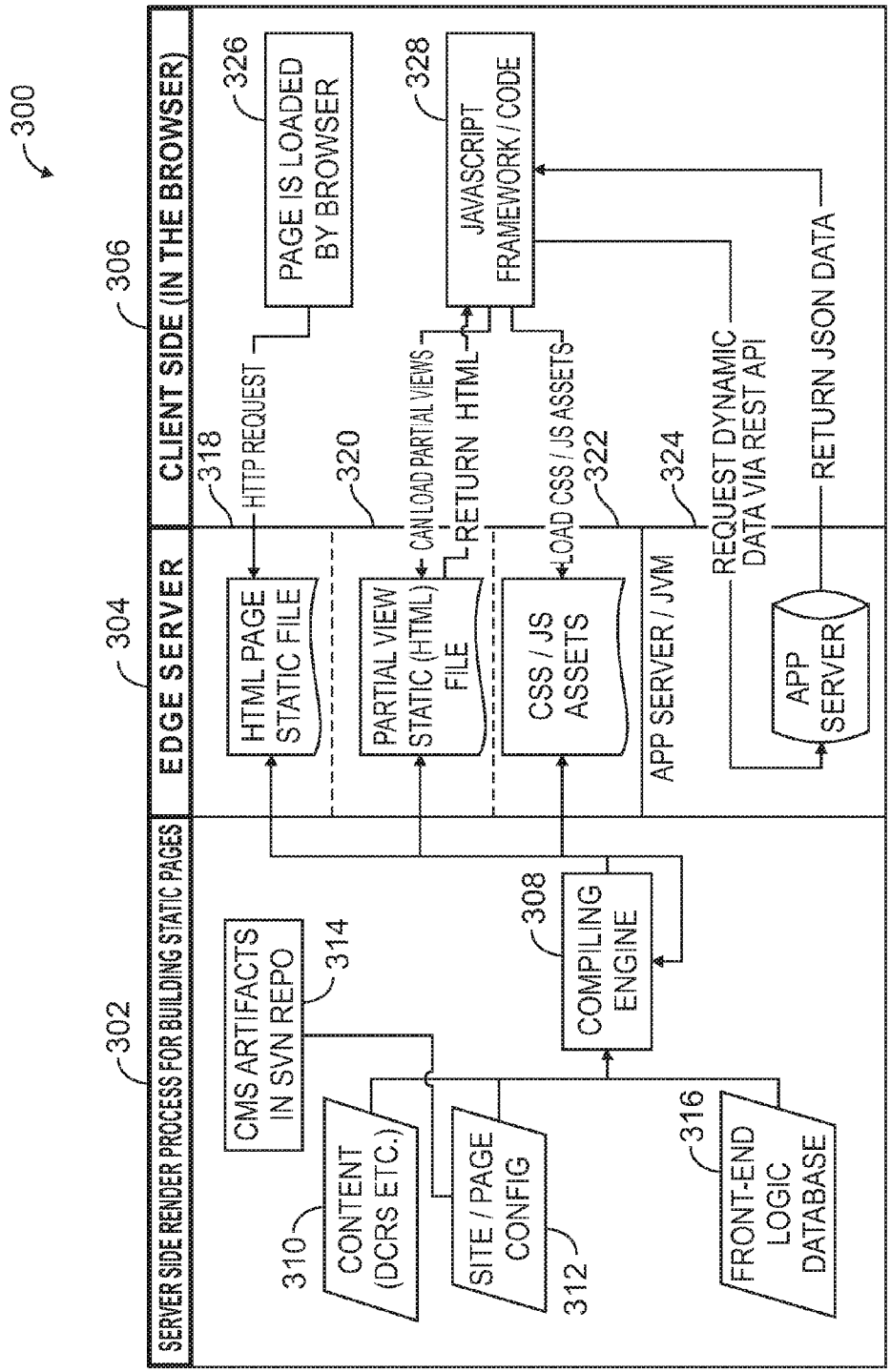
FIG. 3 shows illustrative apparatus in accordance with principles of the invention.

FIG. 3 shows a schematic view of illustrative system 300. Illustrative system 300 may include compiling machine 302, edge server 304 and client device 306. The client browser may run on client device 306. Each of compiling machine 302, edge server 304 and client device 306 may include one or more of the hardware elements shown in FIGS. 1 and 2.

In compiling machine 302, compiling engine 308 may compile static web pages and static web page components that include information from content database 310 and configuration files stored in configuration database 312. Development management system may provide content management system ("CMS") functionality. Development management system may provide version management (e.g., "SVN") functionality.

Compiling engine 308 may compile static web pages and static web page components that include scripts, such as Javascripts, from front-end-logic database 316. The scripts may include an instruction, such as the instruction that is executable by the client browser. The instruction may determine a client configuration parameter. The instruction may formulate a platform identifier corresponding to a virtual machine for processing the client-input result. The instruction may formulate a request for dynamic data from the edge server. The instruction may request a static web page from the edge server. The instruction may request a static web page component from the edge server. The instruction may be one of multiple instructions that correspond to static web page components. The instructions may thus build from the components, at run-time, in the browser, a web page.

Edge server 304 may provide virtual storage area 318. Virtual storage area 318 may store one or more HTML page stack files. The HTML page stack files may include one or more compiled web pages. Each of the web pages may include one or more compiled web page components. Edge server 304 may provide virtual storage area 320. Virtual storage area 320 may store one or more partial view static HTML files. Each of the partial view static HTML files may include one or more compiled web page components. The resources in storage area 320 may provide to a browser HTML files in response to requests from the browser for partial views. Edge server 304 may provide virtual storage area 322. Virtual storage area 322 may store one or more script assets, such as cascading style sheet files or javascript files.

The resources in areas 318, 320 and 322 may be provided by compiling engine 308.

Edge server 304 may provide virtual storage area 324. Virtual storage area 324 may include one or more application servers or one or more virtual java machines. The resources in area 324 may respond to browser requests for dynamic data. The browser requests may be compliant with REST API protocols. The resources in area 324 may respond to the browser requests by providing JSON data to the browser.

Client device 306 may support the browser. In the browser, executable instructions, such as javascript may implement logic that controls call to edge server 304 for compiled components. The components may include one or more views of a web page. The instructions may implement logic that controls call to edge server 304 for one or more data or data objects. The instructions may implement logic that builds from the components and the data a view corresponding to a complete web page and may deliver HTML for the web page to the browser for display on client device 306.

In client device 306, browser operating system display functions 326 may load a compiled web page that it retrieved from the HTML static page file in area 318. Browser logic functions 328 may assemble one or more of the static web page components into a complete web page view for display by the browser. For example, functions 328 may pass control of the complete web page view to functions 326 for display on browser hardware. Functions 328 may rebuild the complete web page in whole or in part, at one time, over the course of interactions with a user of device 306, or in response to time-series executed instructions provided to edge server 304 by compiling engine 308 and from edge server 304 to device 302. For example, when a user is interacting with a payment calculator, the user may enter data into the calculator and press calculate. The data may return to the calculating server. The calculating server may respond with processed data. In response to the server responding to the processed data, the page may rebuild itself, based on instructions loaded into the browser, to display the data in a manner consistent with logic embodied in the instructions.

Figure 4:
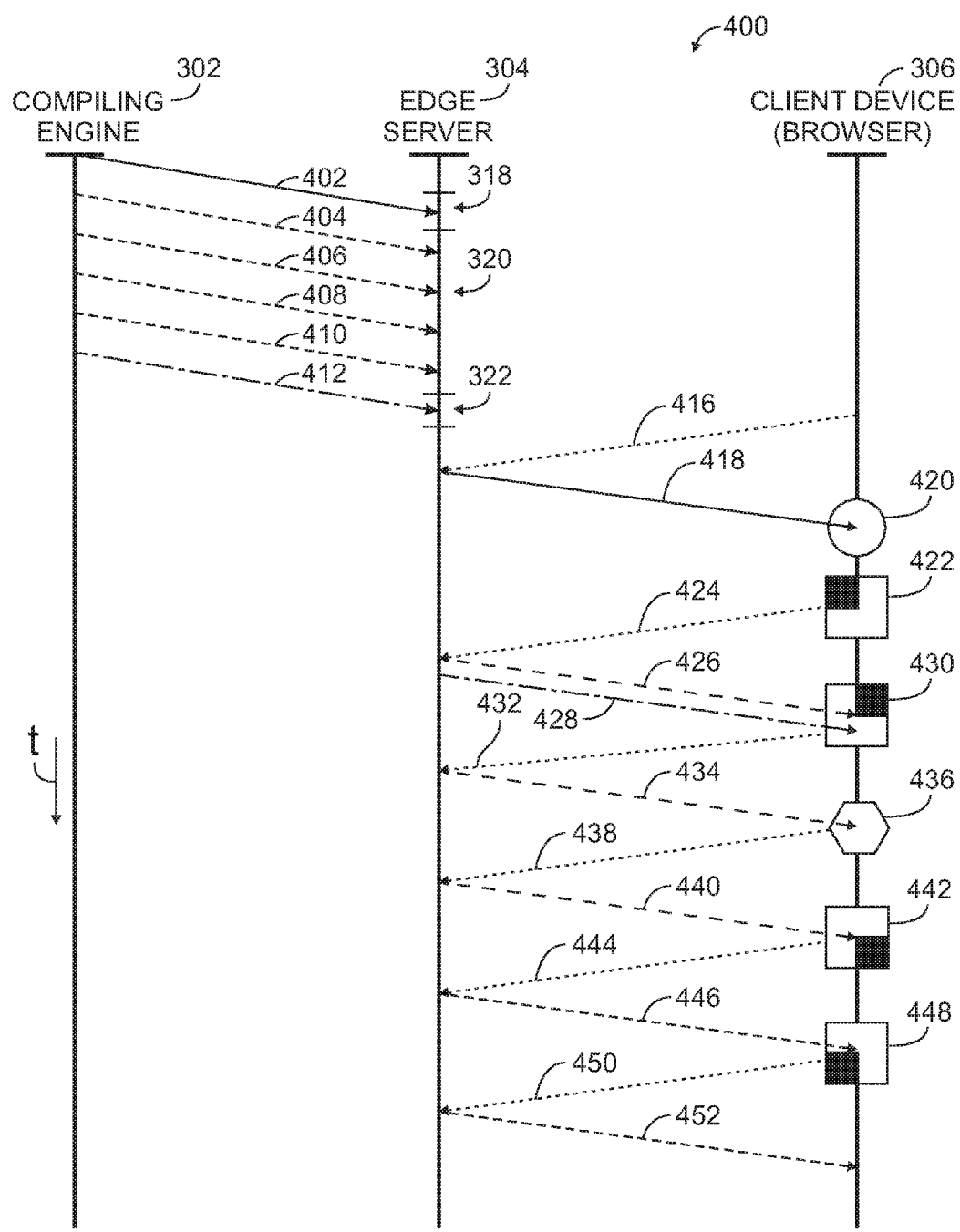
FIG. 4 shows an illustrative data flow in accordance with principles of the invention.

FIG. 4 shows illustrative data flow 400. Data flow 400 shows data flow between compiling engine 302 (shown in FIG. 3), edge server 304 (shown in FIG. 3) and client device 306 (shown in FIG. 3). Compiling engine 302 may perform transmissions such as 402, which may be stored in memory area 318 (shown in FIG. 3) of edge server 304. Compiling engine 302 may perform transmissions such as 404, 406, 408 and 410, which may be stored in memory area 320 of edge server 304. Compiling engine 302 may perform transmissions such as 412, which may be stored in memory area 320 (shown in FIG. 3) of edge server 304.

Transmission 402 may include a complete compiled static web page. Transmissions 404, 406, 408 and 410 may each include a compiled static web page component. Transmission 412 may include cascading style sheets, javascripts and other page configuration or formatting components.

One or more different transmissions such as 402, 404, 406, 408, 410 and 412 may be transmitted by compiling engine 302 to edge server 304.

Time generally progresses downward in the direction of arrow t, but the order of transmissions is not fixed by flow 400. Some or all of the information present on edge server 304 may be retrieved by client device 306. Compiling engine 302 may transmit more compiled static web pages, compiled static web page components and cascading style sheets, javascripts and other page configurations or formatting components independent of interactions between edge server 304 and client device 306.

A user may cause client device 306 to interact with edge server 304. Client device 306 may transmit HTTP request 416 to area 318 of edge server 304. In response, edge server 304 may transmit HTML file via transmission 418 to client device 306. The HTML file may include instructions 420 that load into the browser and may function as a local web page assembler. Instructions 420 may query hardware, software, and user input to formulate web page layout, coordinate static web page components, and provide dynamic web page functions, such as data retrieval.

Instructions 420 may query device and browser parameters, and perhaps user-input. Client device 306 may obtain query result 422 from the queries. Client device 306 may transmit request 424, based on query result 422, to area 320 of edge server 304. Request 424 may be a request for a compiled web page component. Edge server 304 may transmit the responsive compiled web page component to client device 306 via transmission 426. Also in response to request 424, based on result 422, edge server 304 may transmit, via transmission 428, to client device 306 cascading style sheets or java assets for assembly of components such as the responsive compiled web page component, or subsequently transmitted compiled web page components, into a web page displayed by client device 306.

Client device 306 may request other style sheets or java assets if and when required by instructions 420.

Instructions 420 may query device and browser parameters, and perhaps user-input. Client device 306 may obtain query result 430 from the queries. Client device 306 may transmit request 432, based on query result 430, to area 320 of edge server 304. Request 432 may be a request for a compiled web page component. Edge server 304 may transmit the responsive compiled web page component to client device 306 via transmission 434. Also in response to request 424, based on result 430, edge server 304 may transmit, via a transmission (not shown), to client device 306 cascading style sheets or java assets for assembly of components such as the responsive compiled web page component, or subsequently transmitted compiled web page components, into a web page displayed by client device 306.

Instructions 420 may query device and browser parameters, and perhaps user-input. Client device 306 may obtain query result 436 from the queries. Query result 436 may require the processing of data input by the user. Client device 306 may transmit request 438, based on query result 436, to area 324 of edge server 304. Request 438 may be a request for data from an app server or a java virtual machine. Edge server 304 may transmit the responsive data or data objects to client device 306 via transmission 440. Also in response to request 438, based on result 436, edge server 304 may transmit, via a transmission (not shown), to client device 306 cascading style sheets or java assets for assembly or reassembly of components in connection with the responsive data or data object.

Instructions 420 may query device and browser parameters, and perhaps user-input. Client device 306 may obtain query result 442 from the queries. Client device 306 may transmit request 444, based on query result 442, to area 320 of edge server 304. Request 444 may be a request for a compiled web page component. Edge server 304 may transmit the responsive compiled web page component to client device 306 via transmission 446. Also in response to request 442, based on result 440, edge server 304 may transmit, via a transmission (not shown), to client device 306 cascading style sheets or java assets for assembly of components such as the responsive compiled web page component, or subsequently transmitted compiled web page components, into a web page displayed by client device 306.

Instructions 420 may query device and browser parameters, and perhaps user-input. Client device 306 may obtain query result 448 from the queries. Client device 306 may transmit request 450, based on query result 448, to area 320 of edge server 304. Request 450 may be a request for a compiled web page component. Edge server 304 may transmit the responsive compiled web page component to client device 306 via transmission 452. Also in response to request 442, based on result 440, edge server 304 may transmit, via a transmission (not shown), to client device 306 cascading style sheets or java assets for assembly of components such as the responsive compiled web page component, or subsequently transmitted compiled web page components, into a web page displayed by client device 306.

The instructions may query which web page components are currently being displayed by the browser. The requests may request from the edge server web page components that are compatible with a currently displayed web page component.

Requests such as 424, 432, 444 and 450 may be made in parallel to assemble in the browser an entire web page based on query results 422, 430, 442 and 448, as suggested by the complementary patterns associated with those results in the flow diagram.

Requests such as 424, 432, 444 and 450 may be made in serial to assemble in the browser an entire web page based on query results 422, 430, 442 and 448, as suggested by the complementary patterns associated with those results in the flow diagram.

One or more components may remain on display in the browser while one or more others are changed by the results and the requests.

Thus, methods and apparatus for providing content to a client browser have been provided. Persons skilled in the art will appreciate that the present invention can be practiced by other than the described embodiments, which are presented for purposes of illustration rather than of limitation. The present invention is limited only by the claims that follow.

What is claimed is:

1. A method for providing content to a client browser, the method reducing time-to-first-byte for providing the content to the client browser, the method comprising:
    providing a web page compiling machine, the compiling machine arranged to reside behind, with respect to the client browser, an edge server;
    providing the edge server that interfaces between the compiling machine and the client browser, the edge server arranged to reside on an edge of a server network;
    receiving at the edge server, from the compiling machine, a first compiled static web page that includes a first instruction, executable by the client browser, for determining a client configuration parameter from a plurality of client configuration parameters, the client configuration parameter comprising a client hardware parameter;
    delivering, from the edge server, the first compiled static web page to the client browser;
    receiving, at the edge server, from the client browser a request for a plurality of compiled static web page components, the plurality including a compiled static web page component, wherein each of the compiled static web page components corresponds to one or more of the client configuration parameters;
    compiling, at the compiling machine, the plurality of compiled static web page components;
    transmitting, from the compiling machine to the edge server, in response to the request for the plurality of compiled static web page components, a plurality of browser-executable scripts, each of the browser-executable scripts corresponding to one of the compiled static web page components; and
    receiving, at the edge server, a request for a script from the plurality of scripts, the request corresponding to the client configuration parameter, wherein the script includes a second instruction to query the client hardware parameter and the script is configured to:
        receive input from a client data input device via a rendering of the static web page component by the client browser; and
        trigger a request to a virtual machine for information, the virtual machine residing on the edge server.

2. The method of claim 1 wherein the client configuration parameter is a client browser parameter.

3. The method of claim 1 wherein the plurality of compiled web page components are components of one web page.

4. The method of claim 1 wherein the plurality of compiled web page components are components of a plurality of web pages.

5. The method of claim 1 wherein one of the plurality of compiled web page components is part of a first web page and is part of a second web page.

6. The method of claim 1 wherein the second instruction is configured to query a client browser parameter.

7. The method of claim 1 wherein:
    the parameter is a client hardware parameter; and
    the instruction comprises:
        a client hardware parameter query, corresponding to the client hardware parameter, and a client hardware parameter result;
        a client browser parameter query and a client browser parameter result;
        a client input query, for input from a client data input device via a rendering of the static web page component by the client browser, and a client-input result.

8. The method of claim 7 wherein each of the client hardware parameter result, the client browser parameter result and the client-input result, correspond to dynamic data residing on the edge server.

9. The method of claim 7 wherein:
    the static web page component is a first static web page component; and
    each of the client hardware parameter result, the client browser parameter result and the client-input result correspond to a second static web page component, the instruction retrieving from the edge server the second static web page component for display by the browser.

10. The method of claim 7 wherein the request includes an identifier that is keyed to:
    the client hardware parameter result; and
    a client software parameter result.

11. The method of claim 10 wherein the identifier is further keyed to the client-input result.

12. The method of claim 11 wherein the instruction is configured to formulate a platform identifier corresponding to the client-input result, the platform identifier corresponding to an element of a virtual machine residing on the edge server, the element corresponding to an edge server resource for processing the client-input result.

13. The method of claim 12 wherein the component is configured to be displayed by the client browser concurrently with a plurality of other components.

14. A method for providing content to a client browser, the method reducing time-to-first-byte for providing the content to the client browser, the method comprising:

providing a web page compiling machine, the compiling machine arranged to reside behind, with respect to the client browser, an edge server;

providing the edge server that interfaces between the compiling machine and the client browser, the edge server arranged to reside on an edge of a server network;

receiving at the edge server, from the compiling machine, a first compiled static web page that includes an instruction, executable by the client browser, for determining a client hardware parameter, the instruction comprising:
- a client hardware parameter query, corresponding to the client hardware parameter, and a client hardware parameter result;
- a client browser parameter query and a client browser parameter result; and
- a client input query, for input from a client data input device via a rendering of the static web page component by the client browser, and a client-input result;

delivering, from the edge server, the first compiled static web page to the client browser; and receiving, at the edge server, from the client browser a request for a compiled static web page component that corresponds to the client hardware parameter, the request including an identifier that is keyed to:
- the client hardware parameter result;
- a client software parameter result; and
- the client-input result;

formulating, via the instruction, a platform identifier corresponding to the client-input result, the platform identifier corresponding to an element of a virtual machine residing on the edge server, the element corresponding to an edge server resource for processing the client-input result.

15. A method for providing content to a client browser, the method comprising:

providing a web page compiling machine;

providing an edge server that interfaces between the compiling machine and the client browser;

receiving at the edge server, from the compiling machine, a first compiled static web page that includes an instruction, executable by the client browser, for determining a client hardware parameter, the instruction comprising:
- a client hardware parameter query, corresponding to the client hardware parameter, and a client hardware parameter result;
- a client browser parameter query and a client browser parameter result; and
- a client input query, for input from a client data input device via a rendering of the static web page component by the client browser, and a client-input result;

delivering, from the edge server, the first compiled static web page to the client browser, and receiving, at the edge server, from the client browser a request for a compiled static web page component that corresponds to the client hardware parameter, the request including an identifier that is keyed to:
- the client hardware parameter result;
- a client software parameter result; and
- the client-input result;

formulating, via the instruction, a platform identifier corresponding to the client-input result, the platform identifier corresponding to an element of a virtual machine residing on the edge server, the element corresponding to an edge server resource for processing the client-input result; and displaying the component by the client browser concurrently with a plurality of other components.

* * * * *